United States Patent [19]

Foster et al.

[11] 3,918,816
[45] Nov. 11, 1975

[54] TIRE INSPECTION APPARATUS

[75] Inventors: George B. Foster, Worthington; Donald L. Cullen, Columbus, both of Ohio

[73] Assignee: Autech Corporation, Columbus, Ohio

[22] Filed: Apr. 22, 1974

[21] Appl. No.: 463,147

[52] U.S. Cl. .................... 356/167; 356/156; 356/4; 73/146
[51] Int. Cl.² ........................................ G01B 11/00
[58] Field of Search ............... 356/4, 156, 160, 167; 331/DIG. 1; 73/432 L, 146

[56] References Cited
UNITED STATES PATENTS

| | | | |
|---|---|---|---|
| 3,216,311 | 11/1965 | Bibbero et al. | 356/156 |
| 3,796,492 | 3/1974 | Cullen et al. | 356/4 |

OTHER PUBLICATIONS

"Non–Destructive Tire Analysis," by Wolf, *Rubber Age*, Vol. 102, Apr. 1970, pp. 58–64.
"Non–Destructive Testing," by Bibby, et al., *Rubber Age*, Vol. 104, Dec. 1972, pp. 37–48.

*Primary Examiner*—Vincent P. McGraw
*Assistant Examiner*—Paul K. Godwin
*Attorney, Agent, or Firm*—Lawrence A. Hoffman

[57] ABSTRACT

There is disclosed a method and apparatus for rapid and convenient dimensional inspection of a tire. The method involves mounting the tire for rotation and impinging on its tread surface, a laser beam, analyzing the backscattered radiation to determine the position in space of the point of impingement and selectably scanning or positioning the laser to measure various positions on the tire surface. The apparatus includes the laser device, a mounting unit for the tire to be inspected and another mounting unit for the laser gauge. The first mounting unit permits rotation or angular indexing of the tire. The second mounting unit permits four separate gauge motions: radial or circular scan across the tread surface, lateral scan across the tread surface, rotation of the plane containing the laser beam and the backscattered beam and spacing normal to the axis of tire rotation. The former two motions are motor controlled, the latter two are manually controlled.

32 Claims, 14 Drawing Figures

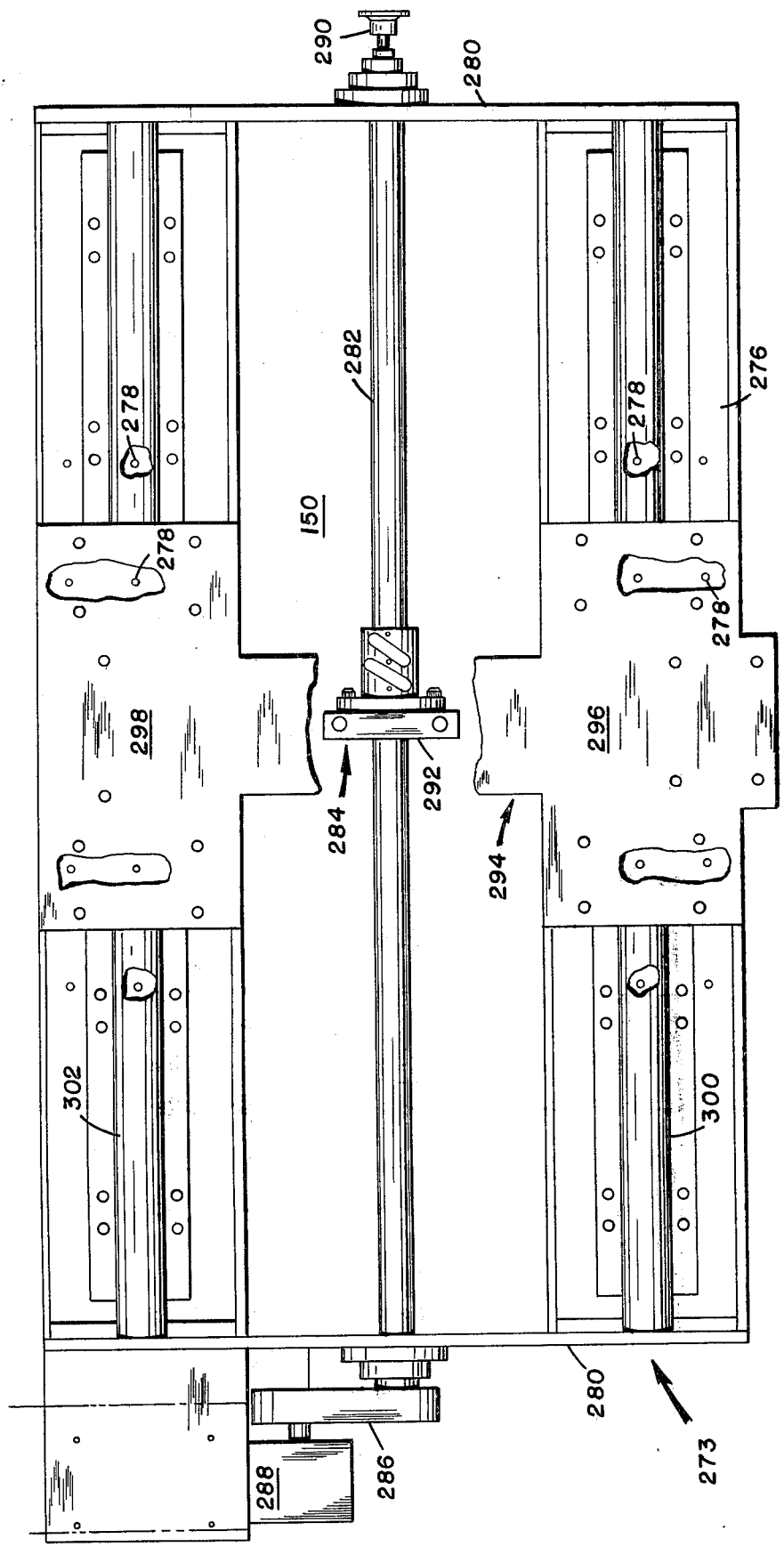

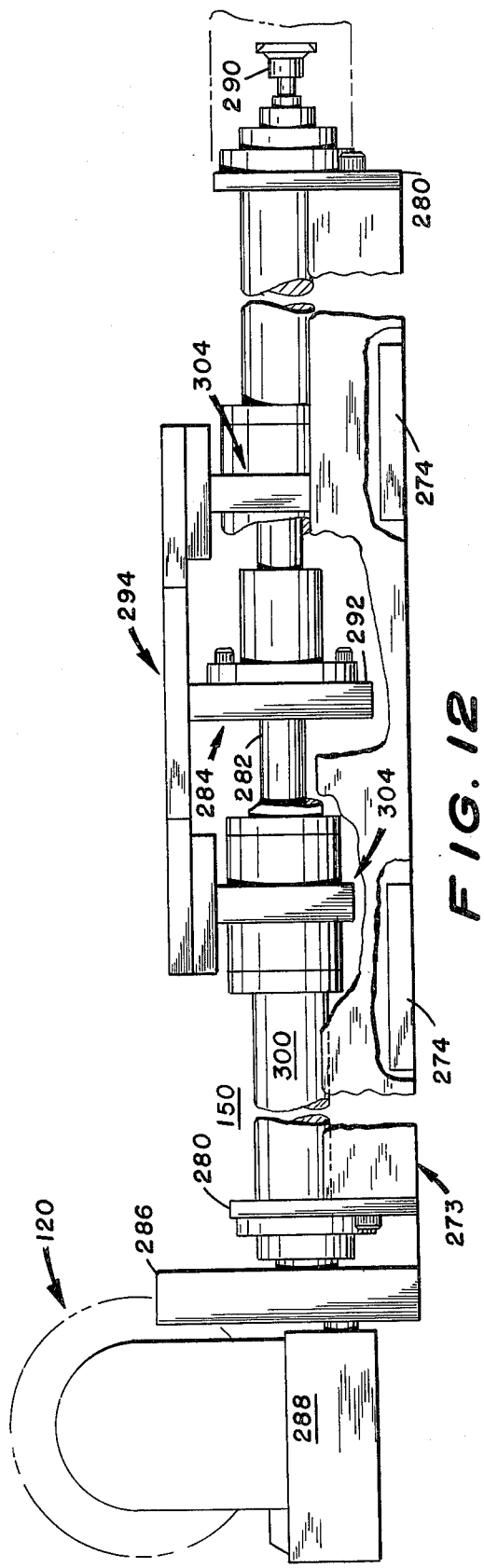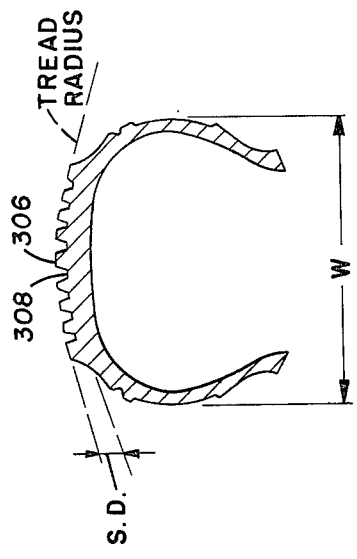

TIRE INSPECTION APPARATUS

INTRODUCTION AND BACKGROUND

The present invention relates to tire inspection, and more particularly to apparatus and a method for rapid and accurate measurement to determine the surface geometry of a tire or a similarly shaped product with a complex surface contour. The invention can be used to determine surface contours and dimension profiles for treadwear analysis, or for dynamic measurement to determine structural imbalances such as run out in a manufactured tire.

In the course of tire tread design and development, tread depth measurements are made at a succession of mileage intervals as a basis for tread wear analysis. The resulting dimensional data may be used to project a tire's tread life or to establish a wear pattern. Other dimensional parameters such as outside diameter, section width, and tread radius are frequently also of interest.

Heretofore, the only practical measurement techniques have utilized hand measuring tools. Typically, tire tread depths are measured by manually probing the tread grooves with a dial indicator until the base of the gauge rests on two adjacent tire ribs. This process is repeated at various places around the tire and the groove depth recorded as a measurement of the amount of tread remaining.

Unfortunately, there are several serious disadvantages inherent in the above described manual technique. First, this method is not totally objective, so, the results of the measurements depend on the measuring techniques employed by an individual technician. Variations can exist in gauge alignment, compression of the rubber under the gauge, or variation in measurement locations during each measurement cycle. Moreover, for tires exhibiting what is known as "step wear", i.e., significant differences in wear between two adjacent tire ribs, the wear pattern is often obstructed by the fact that the gauge itself rests on the two adjacent ribs.

Another important disadvantage relates to manpower utilization. Tire measurements of the type in question are often made on large number of tires daily and the resulting data is transmitted over telephone lines from a remote location to a central computer for data storage and analysis. The manual techniques described above require two technicians, one to make the measurement, and to call out the results, and another to record the measurements manually. The so-produced data is then transferred by keypunch to a computer—compatible format and transmitted to a computer for storage and utilization.

For some time, efforts have been directed toward overcoming the above described difficulties, and toward producing an improved tire inspection system capable of rapid and accurate measurement not subject to the above described and other disadvantages. The apparatus and methods of this invention constitute a successful culmination of such efforts.

BRIEF DESCRIPTION OF INVENTION

According to the present invention, there is provided a non-contact laser gauging system relying upon the impingement of a laser beam on the tire surface, and the measurement and analysis of back-scattered light to determine accurately the position of the point of impingement in relation to a reference position in space. The gauge is mounted to scan the surface of the tire in several precisely controllable degrees of freedom whereby any desired position or portion of the tire can be measured.

Among the features of the method of this invention are the controlled rotation of the tire to be inspected either to a selected angular position, or through an entire revolution or the controlled linear scan parallel to the rotational axis of the tire. This may be either continuously (with the tire fixed at any desired angular position) or at a selected lateral position (with the tire rotating through an entire revolution). If the tire is rotated, several fixed lateral positions may be selected for tire inspection whereby an overall tread wear profile is developed. Likewise, with the gauge at a fixed lateral position, and the tire rotating, a run out measurement may be obtained. Alternatively, the tire may be fixed at a succession of angular positions, and scanned laterally to produce the desired tread wear measurements.

Another feature of the method of this invention is the utilization of a controlled circular scan around the tread for tread radius measurement, or groove and rib measurement on a tire having a critical tread radius or where the exact angle of impingement on the tread pattern is important. An additional utilization of the circular scan can be for the direct generation of a cross sectional tread profile, for example, by means of an x-y plotter.

The above described invention significantly alleviates the difficulties inherent in the prior art. For example, utilization of the present invention materially increases the speed with which measurements can be made and improves the utilization of manpower since only a single operator is necessary. At least as important, however, is the fact that the data generated is computer compatible, i.e., it is in a form directly transmittable for storage and processing by a computer without the intermediate keypunching operation. In addition, the techniques of this invention provide a readily available measurement of tire run out, tread radius, and profile plots giving direct visual indications of the tread wear patterns in a tire under inspection or development.

The apparatus according to this invention includes the gauging equipment previously referred to, a gauge mounting assembly, a tire mounting and rotation assembly, drive mechanisms and position encoders for controlling the various tire and gauge motions, and an electronic system for data generation and processing and for position and motion control.

Accordingly, it is among the objects of the present invention to provide:

An improved method and apparatus for tire inspection and testing;

An alternate method and apparatus for tire inspection and testing which overcomes the various difficulties and deficiencies in prior art techniques;

A method and apparatus employing a non-contact laser gauge to generate tire surface position data;

A method and apparatus for generating tire tread wear information in digital and analog form;

A method and apparatus for generating visual tire tread profiles;

A method and apparatus for generation of dynamic data such as run out;

A method and apparatus for generating tire measurements in computer compatible form to avoid the necessity for converting manual measurements for computer storage and processing;

Apparatus including means to mount and rotate a tire under inspection, a gauging system to impinge a laser beam on the tire surface, and to analyze the back-scatter radiation to develop surface position data, and means to position and/or move the gauge laterally across or circularly around the tread face as desired to accomplish the desired measurements;

A tire inspection method including rotating a tire, impinging a laser beam on the tire surface, and analyzing the back-scattered radiation to obtain surface position data and positioning the laser beam on the surface of the tire where desired in a transverse or circular scan across the tire tread face to obtain measurements at desired positions.

The exact nature of this invention, as well as other objects and advantages thereof will become apparent from the following detailed description, in conjunction with the drawing, in which:

FIG. 11 is a top plan view of the linear travel subassembly, partially broken away for clarity of illustration;

FIG. 12 is a side elevation of structure shown in FIG. 11, partially broken away to show internal details;

FIG. 13 is another illustration of a tire tread profile showing the various measurements readily obtainable by the method and apparatus of the present invention.

DETAILED DESCRIPTION OF THE INVENTION

Figure 1:
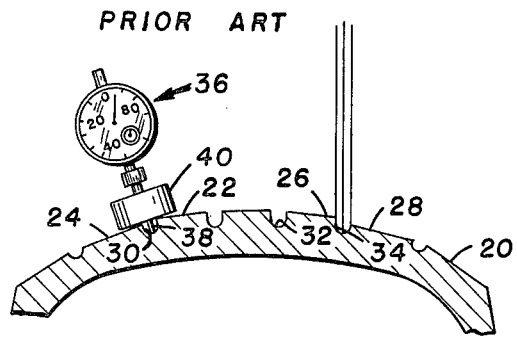
FIG. 1 is a schematic representation of a tire tread profile showing prior art manual gauging techniques, and one of the advantages of the laser beam gauging technique in accordance with this invention.

Referring first to FIG. 1 there is shown a fragmentary cross sectional view representative of a tire tread 20. As is known, a tire tread is characterized by a succession of ribs such as 22, 24, 26, 28, separated by grooves such as 30, 32, and 34. As will further be appreciated, the tread depth is defined by the difference between the height of a rib and the adjacent groove.

Traditionally, tread depth measurements have been made by utilization of a manual feeler gauge such as indicated at 36. The gauge includes a probe or feeler 38, a base portion 40, and a suitable indicator. In operation, a gauge such as 36 is placed with its probe in a groove and the base portion resting on a pair of adjacent ribs. Such a measurement technique, as previously mentioned is time consuming, and is also subject to a substantial inaccuracy when the measurement is made between a pair of adjacent ribs such as 22 and 24 showing very substantial disparity in wear, a phenomenon known as "step wear." As may be seen, although the groove depth may be measured by gauge 36, the fact that the adjacent ribs have worn unevenly is not measureable.

In contrast to the above, the present invention employs an extremely small laser beam impinging upon the entire surface to obtain position data of the surface in relation to a fixed reference. Thus, by impingement of a laser beam on ribs 26 and 28, and within adjacent proove 34, measurement of a substantial disparity in wear between ribs 26 and 28 is readily possible.

Figure 2A:
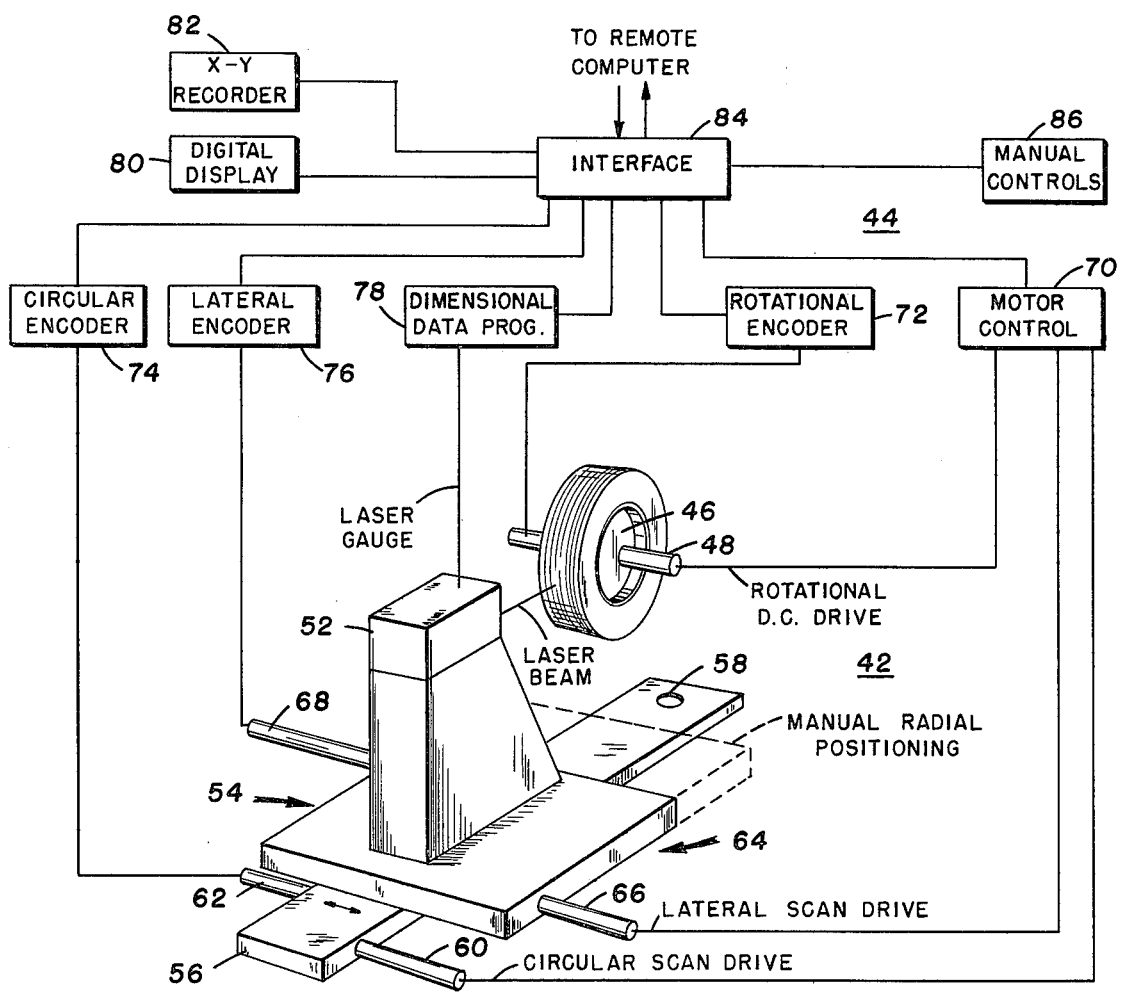
FIG. 2A is a highly schematic representation of the mechanical portion of this system, and an overall diagram of the electronic portions of the system.

Equipment for accomplishing the measurements in accordance with the present invention is schematically illustrated in FIG. 2. The equipment includes a mechanical sub-system, generally denoted at 42 and an electronic sub-system generally denoted at 44. The mechanical sub-system includes a tire mounting mechanism generally denoted 46 including a rotational drive 48 and a position encoder 50, a laser gauge 52, described below, and a gauge mounting and positioning apparatus 54. The latter includes a elongated beam member 56 pivotally mounted at 58 and having a drive mechanism 60 for rotating the beam about the pivot. A position encoder 62 provides information concerning the angular position of the beam.

Mounted on beam 56 is a lateral scanning mechanism 64 upon which laser gauge 52 is mounted in a suitable fashion. Scanner 64 is controlled by a lateral scan drive motor 66 and its lateral position is monitored by means of a further position encoder 68.

Drive motors 48, 60, and 66, and position encoders 50, 62, and 68 operated in conjunction with the electronic portion of the system 44 which includes a motor control unit 70 coupled to drive units 48, 60, and 66, a rotational encoder circuit 72 connected to rotation position sensor 50, a circular motion encoder circuit 74 connected to position sensor 62, and a lateral position encoder circuit 76 connected to sensor 68. The output of the laser gauge itself is coupled to a dimensional data processing circuit 78. This is generally representative of a sub-system which generates both computer compatible digital data, preferably in 4 digit BCD form, and analog data. The former may be used either for storage and/or processing, or for display be means of a suitable digital display unit 80. The analog data is advantageously used to generate tread profile as by means of an encoder circuits and an X–Y recorder 82.

The latter units, as well as 72, 74, and 76, and data processor 78 are coupled through a suitable interface 84 to receive commands from a remote computer or from a set of manual controls generally indicated at 86 and to provide data outputs to the computer or to the display units 80 and 82. The exact construction of the interface unit, depends on the particular functions to be accomplished and the external devices to which the same is connected, as will be apparent. Alternatively, rather than an interface unit 84, either a properly programmed general purpose computer, or a special purpose computer may be employed thereby resulting in a self-contained system.

The construction of laser gauge 52 is not specifically a part of this invention, and is omitted here in the interest of simplicity. Briefly, however, there is shown in schematic form in FIG. 2B the general principle of operation of a laser gauging unit found to be particularly advantageous for utilization in connection with this invention. Such a laser gauge is shown and described in detail in Assignee's U.S. Pat. No. 3,796,492, issued Mar. 12, 1974 in the name of Donald L. Cullen et al., and entitled LASER DIMENSION COMPARATOR and in Assignee's Cullen, et al. U.S. Pat. Application Ser. No. 323,786, filed Jan. 15, 1973 and entitled LASER DIMENSION COMPARATOR, the disclosures of both of which are incorporated herein by reference.

While apparatus operating in accordance with the principles of the aforesaid Patent and Application are preferred in accordance with this invention, it should be recognized that other comparable units might also be used without departure from the scope of this invention.

Figure 2B:
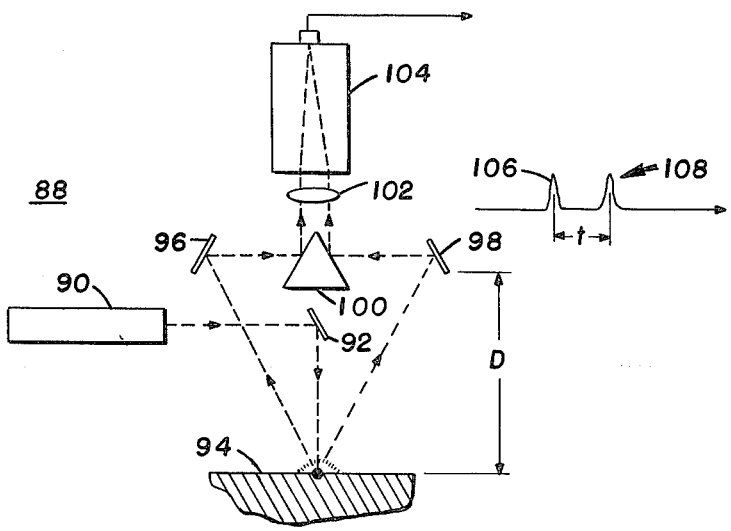
FIG. 2B is a similarly shematic drawing of the optical gauging system.

Briefly, now, with reference to FIG. 2B, the laser gauge, generally denoted 88, comprises a laser 90 adapted to emit a narrow beam of red light arranged to impinge, by means of a mirror 92 onto a selected portion of the surface 94 of the object under inspection. Back-scattered light from the point of impingement is collected by means of another set of mirrors 96, 98, and 100, and a suitable optical system 102 for impingement on the face of an image converter 104, such as a Vidicon or the like.

Operation of gauge 88 is such that the position of the surface, e.g. as represented by the distance D, determines the position on mirrors 96 and 98 to which the back-scattered beams are reflected, and correspondingly, the lateral spacing of the back-scattered images on the face of image converter 104. Since this spacing may be directly correlated with the distance D, it will be appreciated that scanning the image converter 104 produces a video signal including a pair of pulses 106 and 108 separated by a time interval which is an analog of the spacing. The pulse spacing may be converted into an analog signal, by use of a ramp generator or into a digital signal by controlling a clock driven gate to produce the output of the dimensional data processing unit 78 shown in FIG. 2A. Further details as to the construction and operation of laser gauge unit 88 may be found in the aforesaid Cullen et al. Patent and Application.

The details of the construction of inspection system 54 are shown in FIGS. 3–12.

Figure 3:
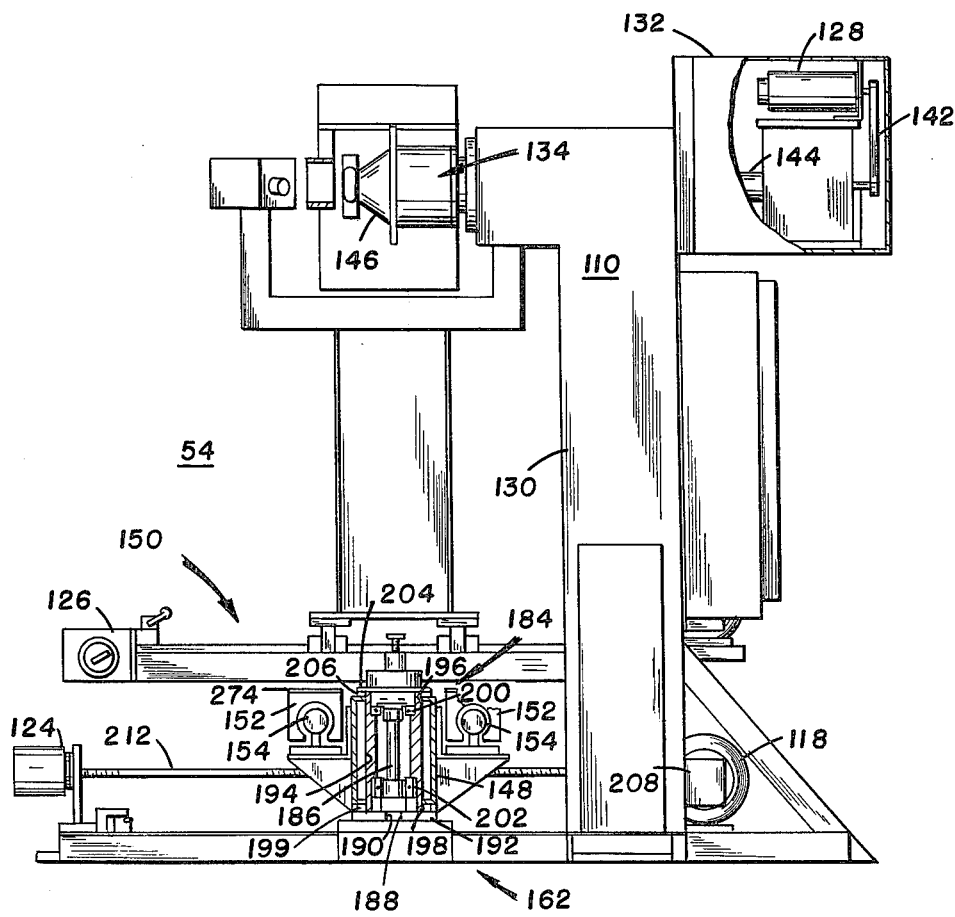
FIG. 3 is a rear elevation showing the overall assembly of the tire inspection apparatus of this invention.
Figure 4:
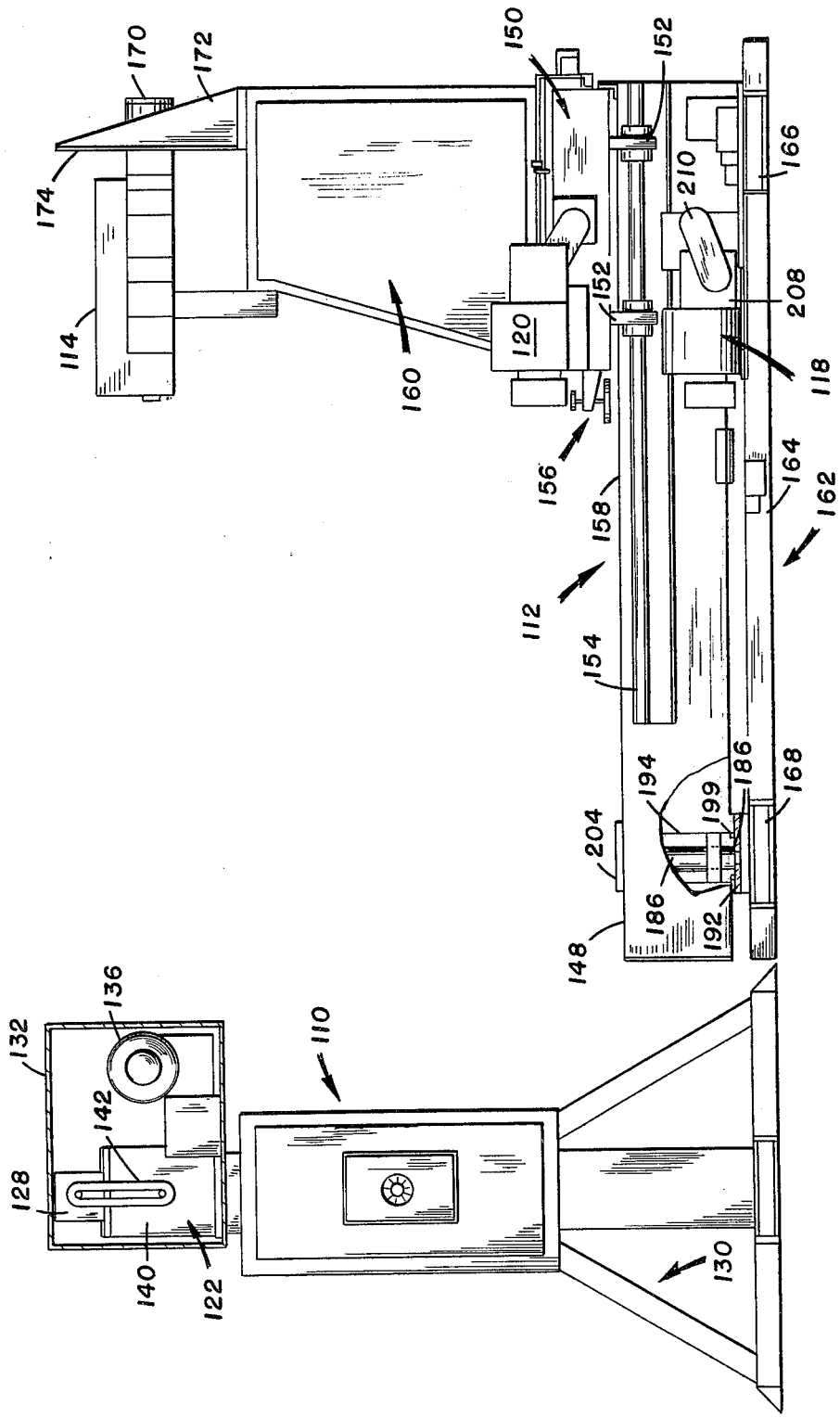
FIG. 4 is a left side elevation of the apparatus shown in FIG. 3 with certain portions omitted, and others broken away to illustrate internal parts.
Figure 5:
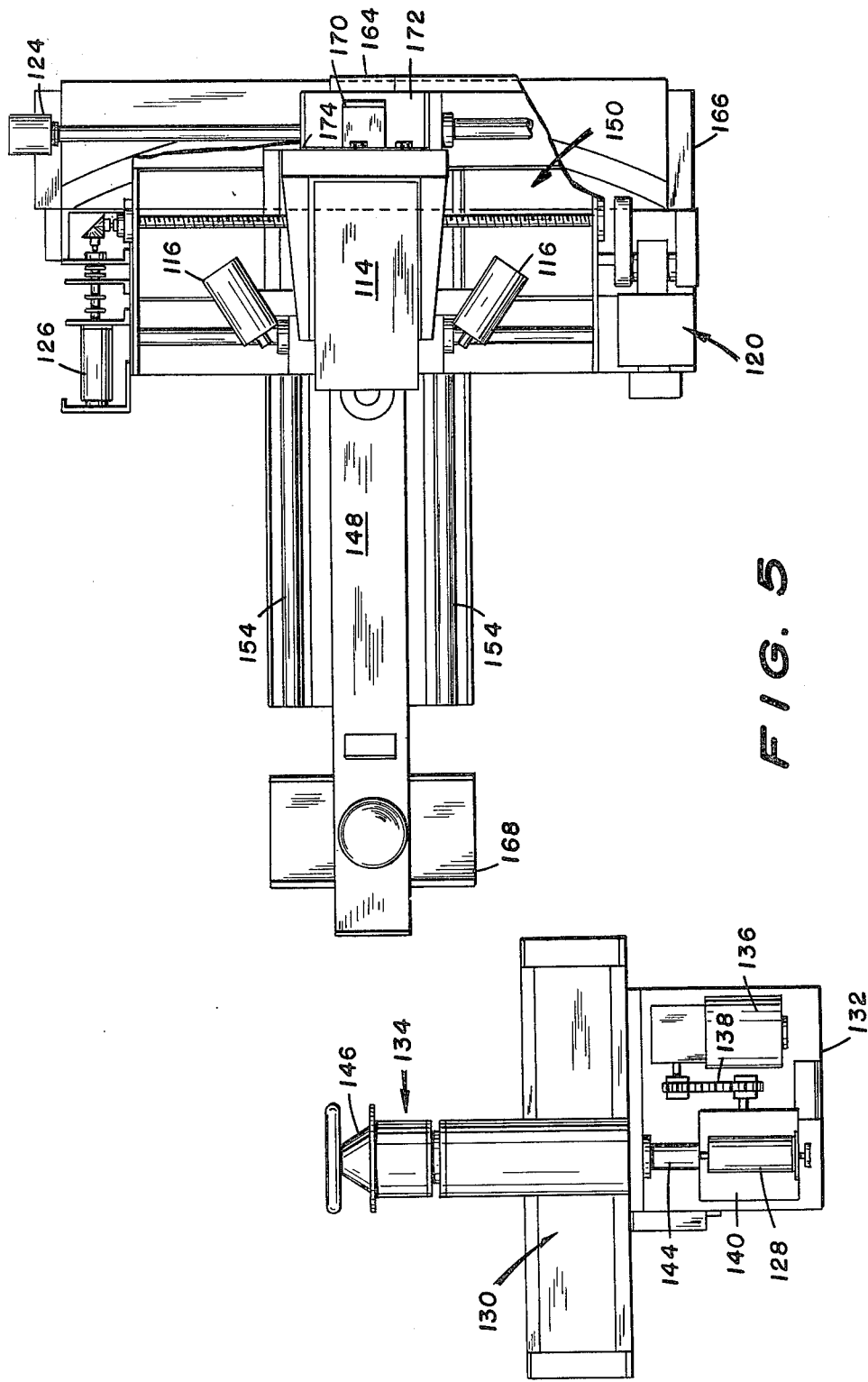
FIG. 5 is a top plan view of the assembly of FIG. 3.

Referring first to FIGS. 3–5 tire inspection unit 54 comprises a wheel mounting and rotation assembly 110, a gauge mounting assembly 112, the actual measuring unit including laser gauge 114, and a pair of edge detection photo cells 116 (referred to in more detail hereinafter). Also included are the circular drive unit 118, the lateral drive unit 120, the wheel rotation drive unit 122, and respective circular, lateral, and rotational position encoder units 124, 126, and 128.

Wheel mounting and rotation assembly 110 comprises a support pedestal 130, a drive housing 132, and a wheel mounting assembly 134. Contained within drive housing 132 are the drive unit 122 includes a DC drive motor 136 and a chain drive unit 138 connected to a transmission 140. A belt drive 142 couples transmission 140 to encoder 128 to provide a succession of pulses as the tire under inspection is rotated.

The wheel mounting assembly 134 includes an elongated shaft 144 driven by transmission 140. A mounting hub 146 constructed in any convenient or desired fashion to accommodate the various wheel configurations which may be encountered is secured at the end of shaft 144 to carry the tire under inspection.

As previously noted, it is among the features of the present invention that the gauge mounting assembly 112 is adapted to allow four distinct types of motion of gauge 114. To this end, mounting assembly 112 is comprised of a hollow elongated beam 148 of generally rectangular cross section, and a linear travel assembly 150. The latter is slidably mounted for manual positioning on a set of four slide bushings, three of which are shown at 152, carried by a pair of shafts 154 mounted on beam 148 as hereinafter described. A positioning stop 156 mounted on linear travel assembly 150 engages with the upper surface of beam 148 at 158 to fix assembly 150 at the desired location along shafts 154.

Laser gauge 114 and edge detector photo cells 116 are positioned on a pedestal 160 mounted on the traversing portion of linear travel assembly 150 as hereinafter described in detail. The entire gauge mounting assembly 112 is supported on a suitable base 162 including an elongated channel shaped radial portion 164, a front channel shaped transverse portion 168. Wheel rotation assembly 110 and gauge support assembly 112 are rigidly connected together in any suitable manner to prevent relative motion, thereby insuring measurement repeatability and accuracy.

Apart from the manual positioning of linear travel assembly 150 along rails 154, another manually adjustable gauge motion is the selective orientation of the inspection plane of gauge 114. Referring back to FIG. 2B, it may be seen that the laser beam, directed onto surface 94 and the two back-scattered beams directed onto mirrors 96 and 98 define a plane, the orientation of which will depend on the orientation of the laser gauge itself. As long as surface 94 is relatively flat, i.e., if any depressions in the surface are of sufficient lateral dimension in the inspection plane not to interfere with the returning back-scatter beams, the orientation of the gauge inspection plane is not important.

However, for the present application, it will be appreciated that the surface under inspection, namely a tire tread is characterized by a variety of circumferential and angularly aligned grooves, the dimensions of which may be sufficiently critical as to require accurate and selectable positioning of the inspection plane. Thus, with reference particularly to FIG. 5 the laser gauge housing includes a forwardly projecting hub (not shown) rotatably mounted in a bearing 170 on vertical supporting portion 172 of pedestal 160. The vertical back plate 174 of support portion 172 includes a pair of arcuate slots 176 and 178. A pair of locking bolts 180 and 182 extend through slots 176 and 178 respectively and into a pair of threaded bores in the back of the laser gauge housing. The gauge may therefore be rotated with bolts 180 and 182 travelling in slots 176 and 178 to the desired inspection plane orientation, and the bolts tightened to lock the gauge in position.

The remaining two types of gauge motion, i.e., circular motion of radial beam 148, and lateral motion transversely to beam 148 are motor controlled, either for scanning the entire tread surface, circularly or laterally, or for indexing to a particular position. Structurally, the mechanism for accomplishing the circular scanning of beam 148 is shown in FIGS. 3, 4, and 6–10.

Referring first to FIGS. 3 and 4, beam 148 is supported as its rearward end upon a vertical bearing 184 comprising a bearing shaft 186 having a stepped lower end portion 188 welded into an aperture 190 and a base plate 192. The latter is bolted or otherwise mounted on rear channel member 168 to provide a rigid support for shaft 186.

As elongated bearing support cylinder 194 projects through upper and lower apertures 196 and 198 in beam 148. Cylinder 194 is attached to beam 148 by means of a radially projecting base collar portion 194 which is bolted to the underside of the beam. A pair of ball-bearing assemblies 200 and 202 are friction fitted between shaft 186 and support cylinder 194 to provide the rotational freedom for beam 148. A cover plate 204 is bolted in place on the top of beam 148 over a slip fitted spacer ring 206 on cylinder 194 to close off and protect the bearing assembly.

Movement of beam 148 on bearing 184 is accomplished by means of drive motor 118 and a transmission 208 connected by means of a chain drive mechanism 210 to a threaded shaft 212 (see FIG. 3.)

Figure 6:
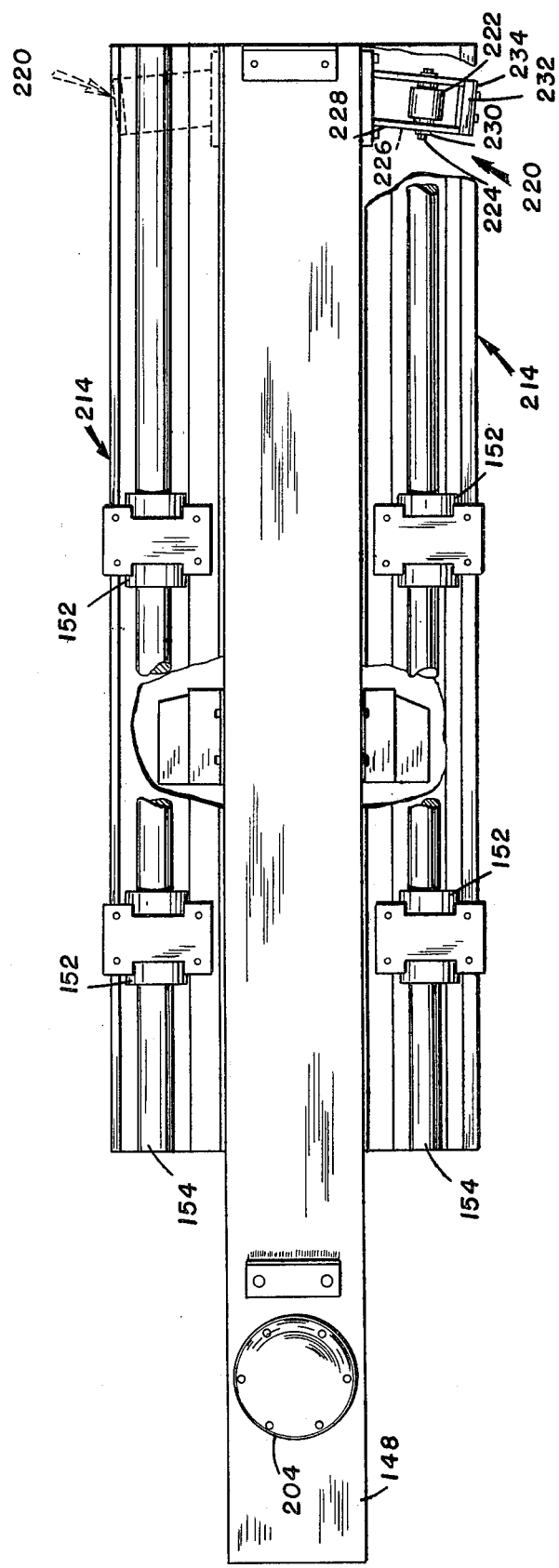
FIG. 6 is a top plan view partially broken away to show internal parts of the radial support beam shown in FIGS. 3–5, and also illustrating the manual tire radius adjusting mechanism.
Figure 7:
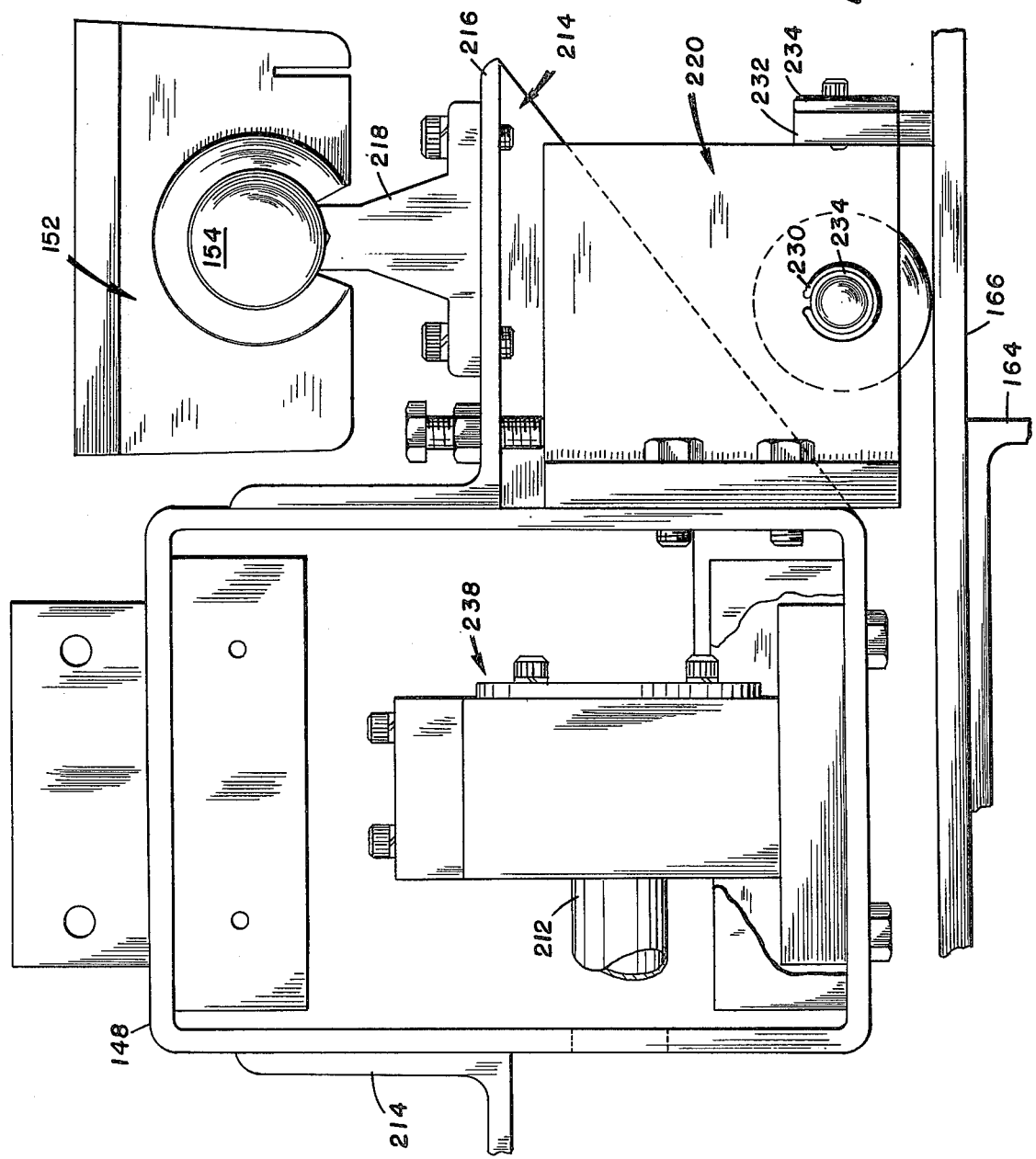
FIG. 7 is a front elevation of the radial support beam, partially broken away to show the beam bearing and support assembly.

Referring next to FIGS. 6 and 7, welded to the sides of radial beam 148 are a pair of elongated downwardly and outwardly depending radius adjustment mechanism support brackets 214. Bolted to the outwardly depending arms 216 of brackets 214 are a pair of shaft support rails 218, upon which are mounted previously referred to positioning shafts 154. Each of shafts 154 is bolted to its associated support rail 218 through a series of spaced counter-bored apertures in the rails, and aligned apertures in the shaft. A set of four ball bushing assemblies 152 attached to linear travel assembly 154 permit positioning of the latter as required along shafts 154 as previously cribed.

Referring still to FIGS. 6 and 7, mounted in opposed relationship at the front end of beam 148 are a pair of front support and roller assembly housings 220 which contain repective roller bearings 222 positioned to travel along the upper surface of front transverse base channel member 166 as beam 148 moves. Each bearing 222 is mounted in a respective one of housings 220 on a shaft 224 extending through apertures 226 in the side walls 228 of the housings, and are secured in place by a pair of snap rings 230 at opposite ends of each shaft. A felt wiper 232 secured by a plate 234 bolted onto the front wall 236 of housing 220 clears any debris from base channel member 166 to protect the bearing assembly inside from damage as beam 148 moves.

As illustrated in FIG. 6, the axes of rotation of bearings 22 are canted slightly from a line parallel to the axis of elongation of beam 148. This is so that the rolling direction of bearings 222 is tangential to the arc of the circle defined by the motion of the beam. In this connection, it will be appreciated that the position of rear bearing assembly 184 in relation to the tire mounting assembly 110 determines the effective radius of the circular scan on the tire tread. For passenger tires, a typical radius is 9 inches, but other radii may readily be accommodated. Actually, the dynamic range of the laser gauging system such as that referred to herein, can accommodate a range of effective standoff distances sufficient for inspection of many different tread radii whereby positioning of rear bearing assembly 184 presents no practical difficulties.

Figure 8:
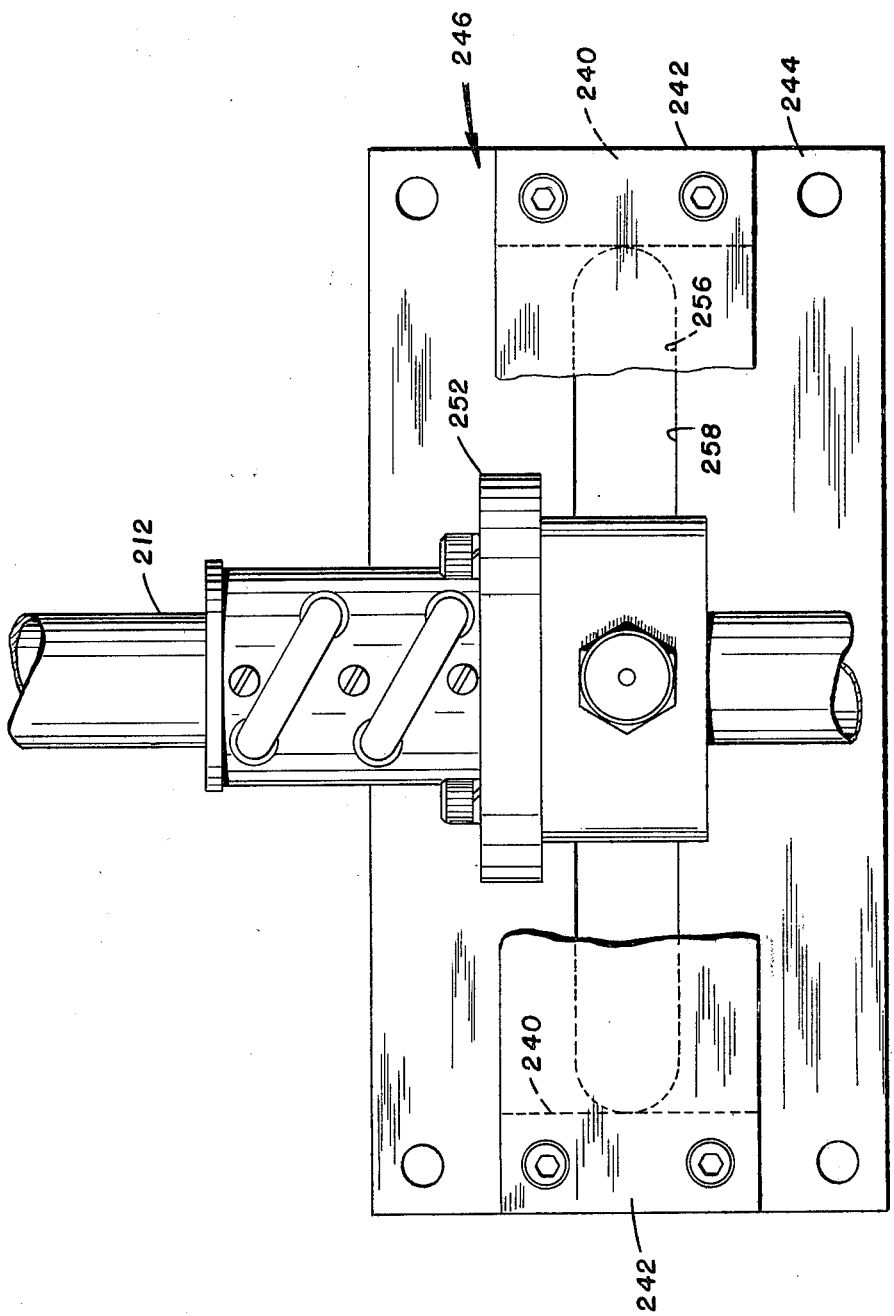
FIG. 8 is a top plan view of the radial beam drive follower, partially broken away to show the details of construction.
Figure 9:
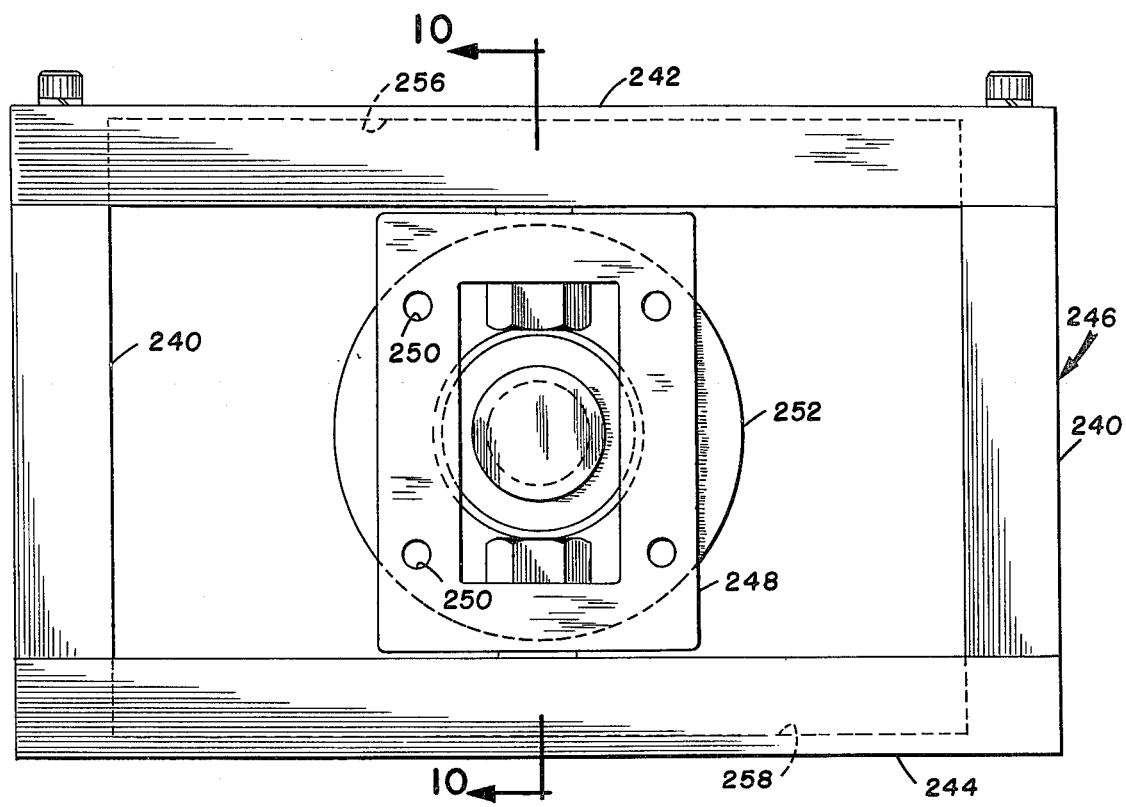
FIG. 9 is a side elevation of FIG. 8.
Figure 10:
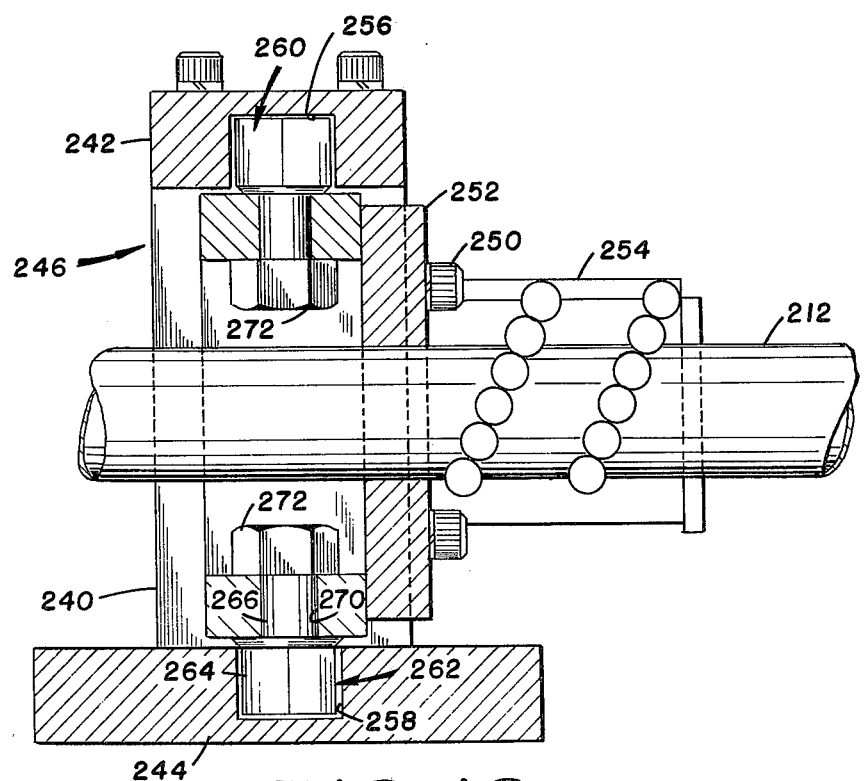
FIG. 10 is a cross-sectional view taken along line 10—10 in FIG. 9.

Translation of motion of screw 212 to beam 148 is accomplished by a follower mechanism, denoted generally at 238 in FIG. 7, and shown in detail in FIGS. 8–10. As illustrated, follower 238 is comprised of a housing including a pair of end plates 240, a top plate 242, and a base plate 244, secured together to form a generally rectangular frame 246. Carried within frame 246 is a second generally rectangular frame 248 to which is attached, by means of four bolts 250 extending through a flange 252, a ball screw follower 254. This engages with threaded shaft 212 to convert the shaft rotation into arcuate motion for radial beam 148.

As will be understood, to accommodate the component of motion of beam 148 normal to shaft 212, follower 238 must permit a second direction of motion. This is accomplished by means of a pair of slots 256 and 258 in upper and lower plates 242 and 244 respectively of frame 246. Carried in slots 256 and 258 are respective upper and lower follower bearings 260 and 262. These bearings are of identical construction, each comprising a head portion 264 and a shaft 266 having a threaded end 268. Shafts 266 extend through respective apertures 270 in the upper and lower ends of frame 248. A pair of nuts 272 on each of shafts 266 secure followers 260 and 262 in place. Thus, as screw 212 rotates the linear motion of follower 254 is imparted to radial beam 148. At the same time, follower 260 and 262 travel within slots 256 and 258 allowing the required arcuate motion of the beam.

Referring next to FIGS. 11 and 12, the linear scan of gauge 114 is provided by motion of gauge support pedestal 160 relative to linear travel assembly 150. The latter, it will be recalled, comprises a generally rectangular frame 273, mounted on four pillow blocks 274, bolted to slide bushings 152 (see FIGS. 3 and 4) and to the bottom 276 of frame 273 through a series of apertures 278.

Frame 273 also includes a pair of end walls 280 which support the opposite ends of a threaded shaft 282 carrying a ball follower 284 identical to follower 254 previously described in connection with FIG. 10. One end of shaft 282 is coupled by a chain drive 286 and a transmission 288 to drive motor 120. The other end of shaft 282 receives a bevelled gear 290 which drives encoder 126 (see FIG. 5.)

Screw follower 284 is attached by means of flange 292 to an H-shaped mounting plate 294. The opposed parallel arms 296 and 298 of mounting plate 294 are supported on spaced parallel shafts 300 and 302 by means of four ball bushing--pillow block assemblies 304. Shafts 300 and 302 are supported by means of support rails in the same manner as shafts 154 previously described. Mounting plate 294 carries the gauge support pedestal 160 and thus provides for the lateral motion of the gauge as shaft 282 rotates.

As previously noted, the tire inspection apparatus constructed in accordance with this invention facilitates a wide variety of measurements. For example, referring to FIG. 13, an obvious measurement is tire tread depth. This may be accomplished in two different ways. According to one procedure, the gauging head is positioned so that the laser spot impinges in a groove such as 308. The tire is then rotated one complete revolution and the dimensional data at selected rotational positions measured and stored.

As will be understood, (see FIG. 2A) selection of the measurement points is controlled by the computer through interface unit 84 with the rotational position data being provided to the computer by rotational encoder 72. Indexing of the gauging head to the required groove position may be done manually by use of control unit 86 or by the computer with lateral encoder 68 providing position information.

Next, a second complete rotation is made with the laser beam impinging on rib 306, and corresponding measurements taken to provide a difference representing the tread depth. Inspection of each rib and groove across the tire at desired angular positions therefore generates a complete tread depth profile.

The second method of determining tread depth is to scan the tread laterally and measure the tread height of each adjacent rib wall of each groove. This procedure is repeated at as many angular positions around the tire as required to completely define the tread depth. The latter procedure is found to be particularly practical in many instances, and yields more rapid results since fewer lateral scans are required. Also, the lateral scanning technique lends itself better to production to an analog plot of the tread wear pattern.

Still referring to FIG. 13, another measurement readily obtainable is tread radius, i.e., the radius of the circle which circumscribes the tread pattern. For such a measurement, the tire positioned at a desired angular address, and a lateral scan effected as previously described. The resulting measurement data is used to generate an accurate analog plot, from which a best fit curve is drawn and the tread radius determined. Further, the tread radius is found to be useful dimension for checking and comparing the dimensional variations of the tire as a function of the various wear tests. It is found to show signs of irregular wear even before the same are visually obvious.

Another measurement readily obtainable is the shoulder drop, designated S.D. in FIG. 13. This dimension is readily obtained during generation of the cross sectional tire profile by means of a radial scan described previously.

Also measurable in conjunction with the radial scan, is the cross section side wall width W indicated in FIG. 13. This dimension is obtainable quite simply by the utilization of the edge detector photo cells 116 shown in FIG. 5. These sensors are so positioned that the laser beam is observed only during such times as the movement of arm 148 permits the impingement of the beam on the tire side walls. Thus, as the arm moves, a first one of photo cells 116 ceases to observe the beam. As the arm continues to move, the other photo cell observes the beam as it passes off the opposite side of the tire. By measuring the interval between turn off the opposite side of the tire. By measuring the interval between turn off of the first photo cell and turn on of the second photo cell, the tire cross section width may readily be determined.

As will be appreciated, several other dimensions are readily obtainable. For example, tire radius may be determined by comparing the actual tire tread position with a reference established by a calibration standard mounted on tire support mechanism 110. By making several radius measurements following successive tire wear tests, and taking into account the tread wear, the tire can be inspected for growth and shrinkage, phenomena which frequently occur as a tire wears. Of course, an additional available measurement is of irregular or step wear as discussed previously in connection with FIG. 1.

Finally, another measurement of which the system is capable is run out. For this purpose, the gauge is positioned over one of the ribs and the tire is rotated one full revolution. The resulting data output represents the total indicated run out for the particular rib selected. Like information may be generated on each of the ribs as a further indication of irregular tire wear.

From the foregoing, it will be apparent that there has been described an improved method and apparatus for tire inspection capable of a wide variety of rapid and objective measurements. It should further be understood, however, that the structure described may be subject to considerable variation within the scope of the invention. For example, the various mechanisms for positioning the gauge may be constructed other than as shown consistent with the method and techniques here disclosed. Likewise other gauging techniques may be employed taking advantage of other energy phenomena including incoherent light and others, again consistent with the concept of impinging an energy beam of appropriate dimension on the surface to be inspected and analyzing returning energy to determine the location of the point of impingement.

We claim:

1. A method for non-destructively inspecting the geometry of a tire comprising the steps of: mounting a tire to be inspected for rotation about its axis, transmitting a narrow energy beam through the atmosphere for impingement on a selected portion of the tire surface; recovering a portion of said beam returning from the point of impingement; analyzing said recovered beam portion to develop an electrical signal analog representative of the location in space with respect to a reference location of a selected portion of the tire surface for a particular rotation position; controllably selecting the measurement location; and controllably rotating said tire to allow inspection at any location on the tire surface.

2. A method as described in claim 1 further comprising selecting a series of inspection locations on the tire tread surface along the tire axis, rotating said tire through a complete revolution for each such axial position and developing a plurality of electrical signal analogs during each revolution.

3. A method as described in claim 2 further comprising sensing the angular position as said tire rotates and developing said electical signal analogs for predetermined angles of rotation.

4. A method as defined in claim 2 further comprising producing a visual plot of the tread profile from the succession of electrical signal analogs for at least one of said revolutions.

5. A method as defined in claim 2 further including generating a signal analog of the difference between the first signal analogs for the axial position corresponding to a tread groove and to the adjacent tread rib to produce a measure of the tread thickness.

6. A method as defined in claim 1 further comprising selecting a series of inspection angles around the circumference of said tire, rotating said tire to each of said measurement angles in succession and developing a series of said electrical signal analogs for selected portions of said tire surface in a plane including the tire axis for each inspection angle.

7. A method as defined in claim 6 wherein said signal analogs are developed at a plurality of spaced points on a line parallel to the tire axis for each inspection angle.

8. A method as defined in claim 6 wherein said signal analogs are developed at a plurality of spaced points on an arc lying in each of said planes.

9. A method as defined in claim 8 wherein each of said arcs lies on the circle defined by the tire tread radius.

10. A method as defined in claim 6 further comprising producing a visual plot of the tread profile from the succession of electrical signal analogs for at least one of said inspection angles.

11. A method as defined in claim 6 further comprising generating an electrical signal analog of the difference between the first signal analog corresponding to a tread groove and to the adjacent tread rib to produce a measure of the tread thickness.

12. Apparatus as defined in claim 1 wherein said energy beam is a light beam.

13. A method of non-destructively inspecting the geometry of a tire comprising the steps of mounting a tire to be inspected, adjustably positioning a measuring device including a laser and means for analyzing the back scattered laser light to determine the location in space of a point of impingement of a laser beam on the tire surface, adjusting the relative position of the tire under inspection and said measuring device and generating an electrical signal analog of the location in space of the tire surface for each of a succession of said relative positions.

14. A method as defined in claim 13 further comprising producing a visual plot of the tire tread profile from said succession of electrical signal analog.

15. A method as defined in claim 13 further including generating a signal analog of the difference between the first signal analogs for a relative position corresponding to a tread groove and to the adjacent tread rib to produce a measure of the tread thickness.

16. A method for non-destructively inspecting the geometry of a tire comprising the steps of: mounting a tire to be inspected about its axis, developing an electrical signal analog representative of the location in space with respect to a reference location of a selected portion of the tire surface for a particular rotational position; controllably selecting the measurement location and controllably rotating said tire to allow inspection at any location on the tire surface; said step of developing said electrical signal analog comprising impinging a laser beam on a selected portion of the tire surface, recovering a portion of the backscattered light from the point of impingement, analyzing said recovered light to determine said location in space and generating said electrical signal pursuant to said analysis.

17. Apparatus for non-destructive inspection of the dimensions of a tire comprising: a first mounting fixture for rotatably supporting a tire to be inspected; a gauging system including means for transmitting a narrow beam of energy through the atmosphere for impingement on the surface of a tire mounted in said fixture, means to recover energy returning from said point of impingement, and means for developing an electrical signal representative of said point of impingement responsive to said recovered energy; a second mounting fixture for the measuring portion of said gauging system; drive means for moving said second mounting fixture to select the position on the tire at which the measurement is made; and means for controlling the rotation of said tire mounting fixture.

18. Apparatus as described in claim 17 wherein said means for controlling the rotation of the tire mounting fixture comprises a motor, and position encoder means for generating electrical signals representing the angle of rotation of said mounting fixture.

19. Apparatus as defined in claim 17 wherein said gauging system includes means to generate a laser beam, means to direct said laser beam for impingement on the surface of the tire under inspection, means to recover a portion of the backscattered radiation from the point of impingement, and means for analyzing the pattern of said backscattered radiation and for generating an electrical signal correlating the position of the tire surface with said backscattered radiation pattern.

20. Apparatus as defined in claim 17 wherein said gauging means comprises means for generating a laser beam, means for directing said laser beam for impingement on the surface of the tire under inspection, optical means for observing light backscattered from said point of impingement from two different aspects relative to said laser beam, means to direct recovered backscattered light onto an image plane in the form of two light spots, the spacing of which is a function of the position in space of the tire surface, image conversion means responsive to said two light spots in said image plane to generate an electrical signal representative of the spot spacing.

21. Apparatus for non-destructive inspection of the dimensions of a tire comprising means for rotatably mounting a tire to be inspected, a measuring device, said measuring device including means for generating a laser beam, means for directing said laser beam for impingement on the surface of the tire under inspection, means for recovering a portion of the backscattered radiation from said point of impingement, and means to analyze the pattern of said backscattered radiation and to generate an electrical signal correlating the position of the point of impingement in space with said backscattered radiation pattern; mounting means for said measuring device; means for adjustably positioning said measuring device relative to the tire under inspection to select the point of impingement of said laser beam on the tire surface; and means for establishing controlled relative motion between said measuring device and said tire to allow selected inspection of the entire tread surface of said tire.

22. Apparatus for non-destructive inspection of the dimensions of a tire comprising: a first mounting fixture for rotatably supporting a tire to be inspected; a gauging system including means for measuring the location in space of a selected portion of the surface of a tire mounted in said fixture, and means for developing an electrical signal representative of said measured location; a second mounting fixture for the measuring portion of said gauging system; drive means for moving said second mounting fixture to select the position relative to the tire at which the measurement is made; means for controlling the rotation of said tire mounting fixture; said second mounting fixture comprising an elongated beam, pivot means for rotatably supporting said beam at one end; and said drive means including means for rotating said beam about said pivot, and position sensing means to provide electrical signal indication of the angular position of said member.

23. Apparatus as defined in claim 22 wherein the said means for rotating said beam comprises a threaded shaft and follower means mounted on said shaft, said follower means being connected to said beam to effect motion thereof as said shaft rotates.

24. Apparatus as defined in claim 23 including a slotted member secured to said beam, said follower including a first portion engaging said threaded shaft and a second portion engaging with said slot.

25. Apparatus as defined in claim 24 wherein said slotted member is so disposed that the slot therein lies parallel to the axis of elongation of said beam.

26. Apparatus as set forth in claim 23 further including mounting means for said follower, pivotally mounted to allow rotation thereof relative to said beam as said threaded shaft rotates.

27. Apparatus as set forth in claim 22 wherein said second mounting fixture further includes first carriage means, means for adjustably positioning said first carriage means along the length of said elongated beam, second carriage means, and support means on said first carriage means permitting adjustable positioning of said second carriage means; and wherein said drive means further comprises means for positioning said second carriage means on its support means.

28. Apparatus as set forth in claim 27 wherein said adjustable positioning means for said first carriage comprises a pair of elongated shaft members mounted in spaced parallel relationship with the axis of elongation of said beam, and slide bushing means mounted on said first carriage means and coupled to said shafts for sliding motion thereon.

29. Apparatus as set forth in claim 27 wherein said adjustable positioning means for said second carriage means comprises a pair of support shafts mounted in spaced parallel relationship normal to the axis of elongation of said beam and a slide bushing means slidably coupling said second carriage means to said support shafts.

30. Apparatus as defined in claim 29 wherein said means for positioning said second carriage means comprises a threaded shaft mounted in spaced parallel relationship with said carriage support shafts and a follower mounted on said second carriage means and coupled to said threaded shaft.

31. Apparatus as defined in claim 27 wherein said second mounting fixture further includes gauge support means fixedly mounted on said second carriage means and including means for adjustably positioning thereon the measuring portion of said gauging system.

32. Apparatus as defined in claim 30 wherein said gauging means is characterized by an axis of elongation extending generally toward the tread surface of the tire under inspection, and wherein said gauge support means includes bearing means cooperating with a complementary portion of said gauge means to support said gauge means for angularly adjustable positioning about said axis of elongation.

\* \* \* \* \*